(12) United States Patent
Diop et al.

(10) Patent No.: US 10,411,369 B2
(45) Date of Patent: Sep. 10, 2019

(54) MULTI-LAYER CABLE SPLICE

(71) Applicant: Hubbell Incorporated, Shelton, CT (US)

(72) Inventors: Seydou Diop, Birmingham, AL (US); Paul Zelazny, Canton, MI (US); Dirk Byerman, Chelsea, AL (US)

(73) Assignee: Hubbell Incorporated, Shelton, CT (US)

( * ) Notice: Subject to any disclaimer, the term of this patent is extended or adjusted under 35 U.S.C. 154(b) by 232 days.

(21) Appl. No.: 15/459,483

(22) Filed: Mar. 15, 2017

(65) Prior Publication Data

US 2017/0271789 A1 Sep. 21, 2017

Related U.S. Application Data

(60) Provisional application No. 62/308,486, filed on Mar. 15, 2016.

(51) Int. Cl.
| | |
|---|---|
| *H01R 4/00* | (2006.01) |
| *H01R 4/70* | (2006.01) |
| *H01R 4/48* | (2006.01) |
| *H01R 43/05* | (2006.01) |
| *H01R 4/50* | (2006.01) |
| *H02G 7/04* | (2006.01) |
| *H02G 7/05* | (2006.01) |
| *H02G 15/10* | (2006.01) |

(52) U.S. Cl.
CPC ............ *H01R 4/70* (2013.01); *H01R 4/48* (2013.01); *H01R 4/5016* (2013.01); *H01R 43/05* (2013.01); *H02G 7/04* (2013.01); *H02G 7/056* (2013.01); *H02G 15/10* (2013.01); *H01R 4/5075* (2013.01)

(58) Field of Classification Search
CPC ... H01R 4/02; H01R 4/04; H01R 4/70; H01R 4/48; H01R 4/5016; H01R 43/05; H02G 7/04; H02G 7/056; H02G 15/10; H02G 4/5075
USPC ..... 174/74 R, 74 A, 84 R, 84 A, 84 C, 88 R, 174/88 C
See application file for complete search history.

(56) References Cited

U.S. PATENT DOCUMENTS

| | | |
|---|---|---|
| 4,252,992 A | 2/1981 | Cherry et al. |
| 4,362,352 A | 12/1982 | Hawkins et al. |
| | (Continued) | |

FOREIGN PATENT DOCUMENTS

EP     1678791     10/2010

OTHER PUBLICATIONS

PCT/US2017/022479 International Search Report and Written Opinion dated May 26, 2017 (13 pages).

*Primary Examiner* — William H. Mayo, III
(74) *Attorney, Agent, or Firm* — Michael Best & Friedrich, LLP

(57) ABSTRACT

A cable splice includes a casing having a central portion and a first end including a first aperture. The casing defines an interior cavity. A guide assembly extends through the first opening into the interior cavity. A first clamp member is positioned in the interior cavity and moveable between a loading position and a terminated position. A first biasing member biases the first clamp member toward the terminated position. A carrier is positioned in the interior cavity between the first biasing member and the central region. A second clamp member is positioned in the carrier and moveable with respect to the carrier.

21 Claims, 15 Drawing Sheets

(56) References Cited

U.S. PATENT DOCUMENTS

| | | |
|---|---|---|
| 7,019,217 B2 | 3/2006 | Bryant |
| 7,608,783 B2 | 10/2009 | Bryant |
| 8,022,301 B2 | 9/2011 | Bryant |
| 9,490,577 B2 * | 11/2016 | Diop .................... H01R 13/641 |
| 9,502,791 B2 * | 11/2016 | Diop ........................ H01R 4/52 |
| 2014/0273575 A1 * | 9/2014 | O'Sullivan ............ H01R 13/62 439/271 |
| 2014/0273609 A1 * | 9/2014 | Diop ................... H01R 13/641 439/489 |
| 2016/0006139 A1 | 1/2016 | Diop et al. |

* cited by examiner

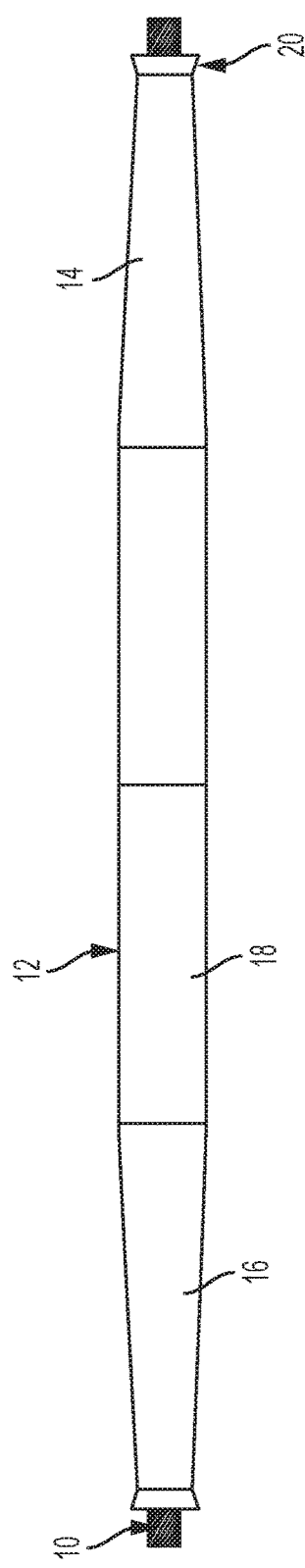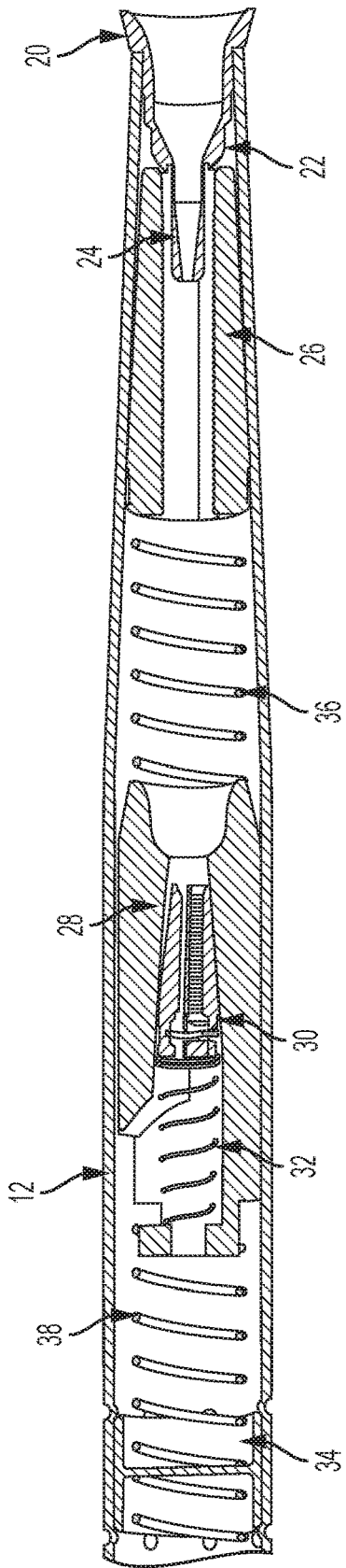

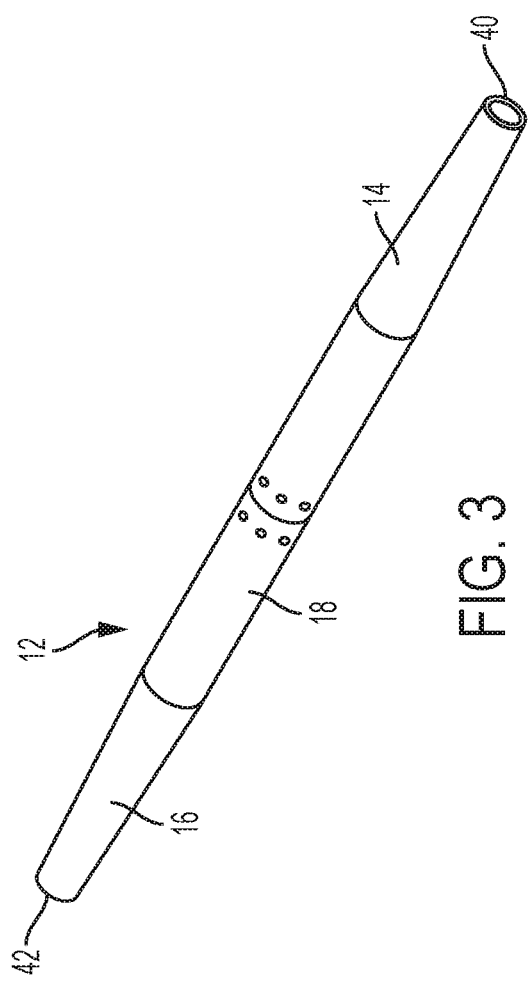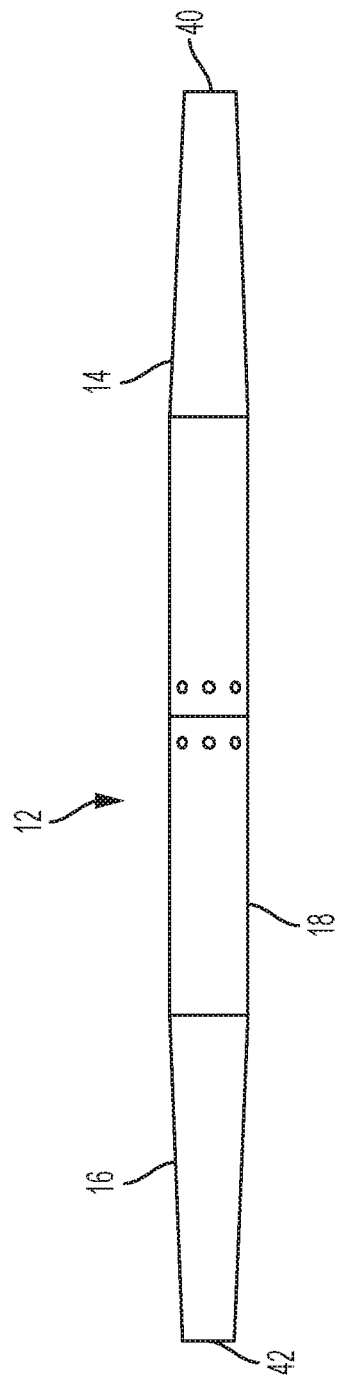

SECTION A-A

SECTION A-A

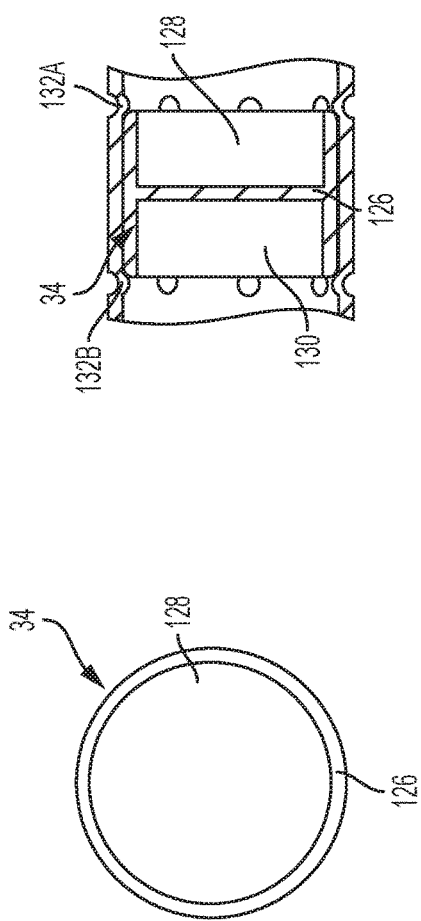
FIG. 32
FIG. 33
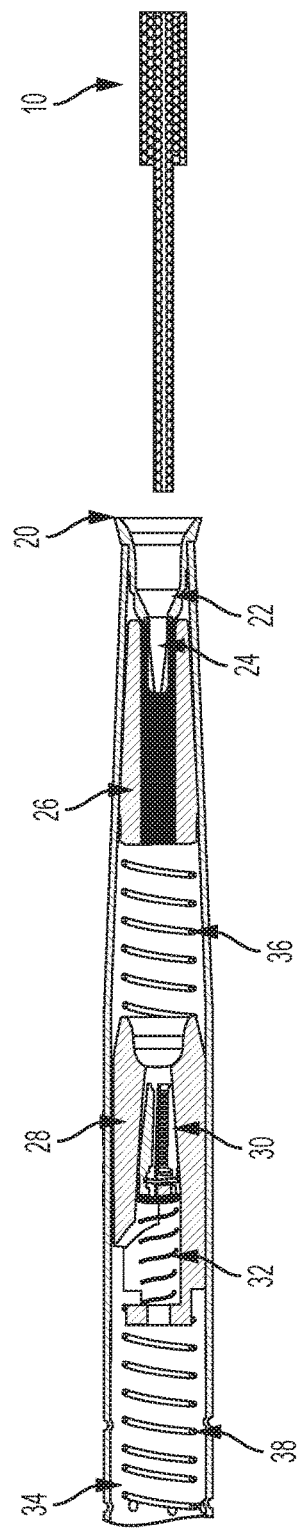
FIG. 34

MULTI-LAYER CABLE SPLICE

RELATED APPLICATION(S)

This application is based on U.S. provisional application Ser. No. 62/308,486, filed Mar. 15, 2016, the disclosure of which is incorporated herein by reference in its entirety and to which priority is claimed.

FIELD

The invention relates to splices for connecting first and second utility transmission line cables.

BACKGROUND

Splicing connectors may be used to join a variety of electrical conductors, including high-voltage power lines. Some splicing connectors allow a user to simply input two different conductors into the connector. Such splicing connectors, commonly referred to as automatic splices, may be used by utility linemen to quickly connect lengths of suspended cables during installation or repair of downed power lines.

An automatic splice typically includes a housing having an opening on each axial end for receiving cables. After the cables are inserted, the housing includes clamps for maintaining the cables in a relative position. The automatic splice is then capable of conducting electricity from one cable to the other. Seating the cables properly in the housing is important to ensure a secure and lasting connection. This seating is especially true in exposed cables undergoing stress from different directions, such as from wind, ice, galloping or additional loading that may occur in regular use.

Utility linemen use automatic splices in normal or emergency power restoration situations, under a variety situations and environmental conditions. Applying significant force to insert the cables or knowing if the cable has been fully inserted may be difficult for the lineman. Automatic splices typically have non-transparent casings or housings, making visual inspection of the cables positioning impossible. If a cable is not properly or fully inserted, the retaining clamps will not function as intended. Failure of a spliced connection can release live cables, risking dangerous conditions to people and property, especially in the instance of live power lines.

SUMMARY

According to an exemplary embodiment, a cable splice includes a casing having a central portion and a first end including a first aperture. The casing defines an interior cavity. A guide assembly extends through the first opening into the interior cavity. A first clamp member is positioned in the interior cavity and moveable between a loading position and a terminated position. A first biasing member biases the first clamp member toward the terminated position. A carrier is positioned in the interior cavity between the first biasing member and the central region. A second clamp member is positioned in the carrier and moveable with respect to the carrier.

According to another exemplary embodiment, a cable splice includes a casing having an opening configured to receive a cable. The casing defines an interior cavity. A guide extends into the casing. An escort cup is positioned in the casing and configured to receive an outer layer of the cable. The escort cup is moveable with respect to the guide. A pilot cup positioned in the casing and configured to receive an inner layer of the cable. The pilot cup is moveable with respect to the guide and the escort cup. A first jaw assembly is positioned in the interior cavity and moveable between a first loading position configured to receive the cable and a first terminated position configured to engage the outer layer of the cable. A second jaw assembly is positioned in the interior cavity and moveable between a second loading position configured to receive the cable and a second terminated position configured to engage the inner layer of the cable.

Another exemplary embodiment is directed to a method of connecting utility line conductors. A multi-strand cable is stripped to remove a portion of an outer layer and expose an inner layer. The cable is inserted into a cable splice that includes an escort cup, a pilot cup, a first jaw assembly, a carrier, and a second jaw assembly positioned in the carrier. The inner layer of the cable is engaged with the pilot cup and the outer layer of the cable is engaged with the escort cup. The pilot cup is moved through the first jaw assembly. The escort cup is moved through the first jaw assembly. The pilot cup is moved into the carrier and through the second jaw assembly.

BRIEF DESCRIPTION OF THE DRAWINGS

The aspects and features of various exemplary embodiments will be more apparent from the description of those exemplary embodiments taken with reference to the accompanying drawings, in which:

FIG. 1 is a side view of an exemplary splice with inserted cables;

FIG. 2 is a sectional view of the splice of FIG. 1 without the inserted cables;

FIG. 3 is a perspective view of an exemplary casing;

FIG. 4 is sectional view of the casing of FIG. 3;

FIG. 32 is a front view of an exemplary center stop;

FIG. 33 is a sectional view of the center stop in the casing;

FIG. 34 is a sectional view of the exemplary splice prior to cable insertion;

DETAILED DESCRIPTION OF EXEMPLARY EMBODIMENTS

Figure 5:
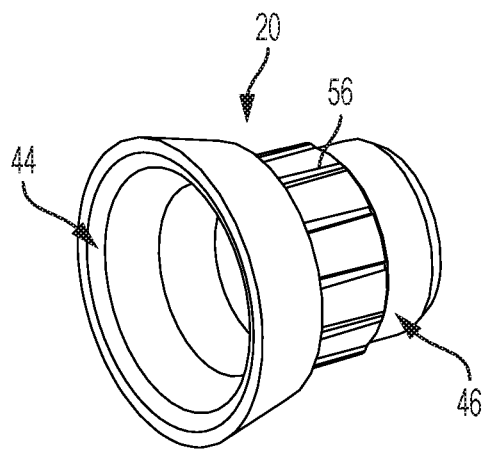
FIG. 5 is a front perspective view of an exemplary guide.

Various exemplary embodiments are directed to a cable splice for use with multi-strand cables 10. Multi-strand cables 10 can include an outer layer that surrounds an inner layer. In an exemplary embodiment, the outer layer is made from a first material, for example aluminum strands, while the inner layer is made of a second material, for example steel strands.

In accordance with an exemplary embodiment, a splice includes a casing 12 having a first side and a second side with each side having a set of components. The casing 12 includes a substantially tubular body having a first casing end 14 and a second casing end 16, at least a portion of which tapers to the respective end of the casing 12. The casing surrounds an internal cavity that can be divided into a first chamber, a second chamber, and a central region. The components in the second chamber may be identical to the first. Certain embodiments, however, may utilize different components in the second chamber. The present invention may also be utilized as a dead-end type connector that has only a single chamber. Although the drawings depict the first and second chambers having identical components, only the components of the first chamber may be discussed in certain instances for brevity.

In an example embodiment, the components can include: a guide assembly having a guide 20, an escort cup 22, and a pilot cup 24; a first clamp in the form of a first jaw assembly 26; a carrier assembly having a carrier 28, a second clamp in the form of a second jaw assembly 30, and a biasing member 32; and a center stop 34. A biasing member 36 is positioned between the carrier assembly and the first jaw assembly 26 and another biasing member 38 is positioned between the center stop 34 and the carrier assembly.

FIGS. 3 and 4 show an exemplary casing 12 having a swaged, tubular body, although a variety of shapes may be used having any number of straight or curved sides. The casing 12 includes a first casing aperture 40 and a second casing aperture 42. The first and second casing apertures 40, 42 may include a chamfered or beveled edge to allow for easy installation of additional components. The first casing end 14 tapers from the central region 18 to the first casing aperture 40, forming a first frusto-conical member defining the first chamber. The second casing end similarly tapers from the central region 18 to the second casing aperture 42, forming a second frusto-conical member defining the second chamber. Various components are housed in the first and second chambers as discussed below. Only the components of the first chamber may be discussed in certain instances for brevity.

The guide 20 can be positioned so that it has a portion positioned outside of the casing 12 and a portion extending into the casing 12 through the first casing aperture 40. The guide 20 receives and guides a cable 10 being inserted into the splice. The guide 20 helps prevent strands of the cable from splaying, allowing a quick, easy, and clean insertion of a length of cable.

Figure 6:
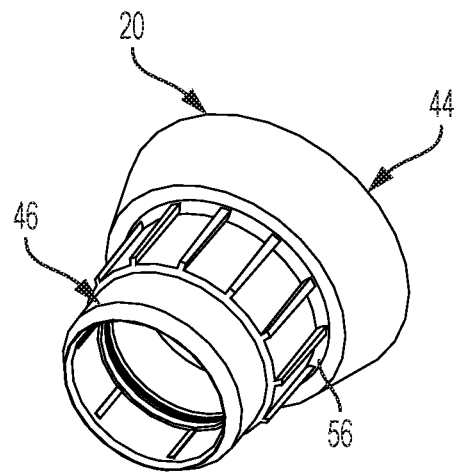
FIG. 6 is a rear perspective view of FIG. 5.
Figure 7:
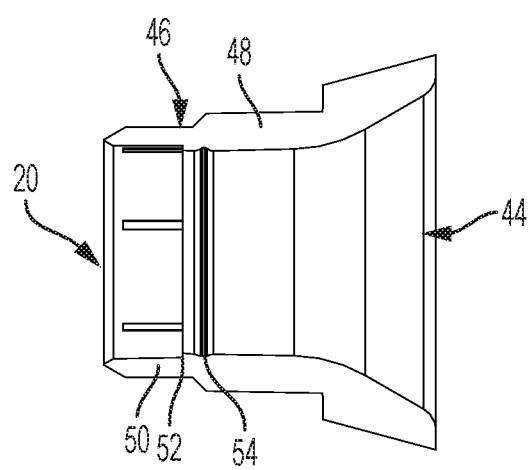
FIG. 7 is a side, sectional view of the guide of FIG. 5.
Figure 8:
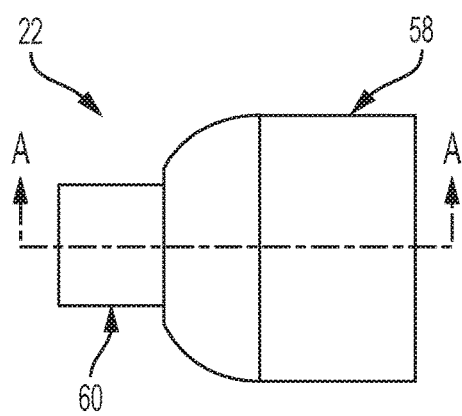
FIG. 8 is a side view of an exemplary escort cup.
Figure 9:
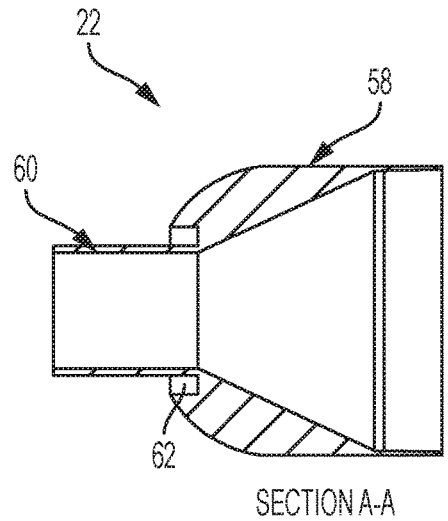
FIG. 9 is a sectional view of FIG. 8.
Figure 10:
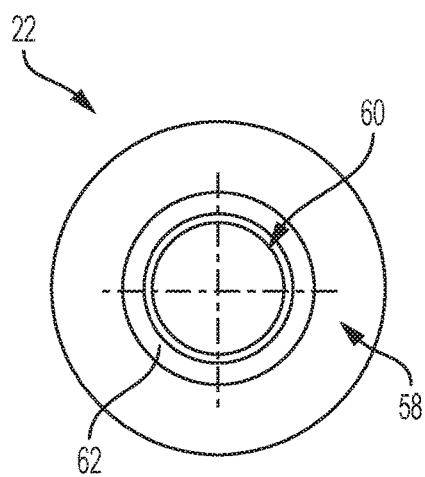
FIG. 10 is a rear view of FIG. 8.
Figure 11:
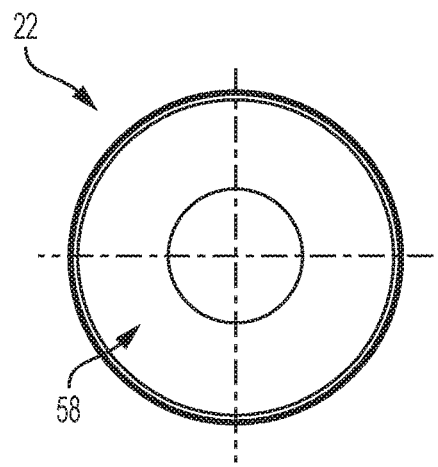
FIG. 11 is a front view of FIG. 8.
Figure 12:
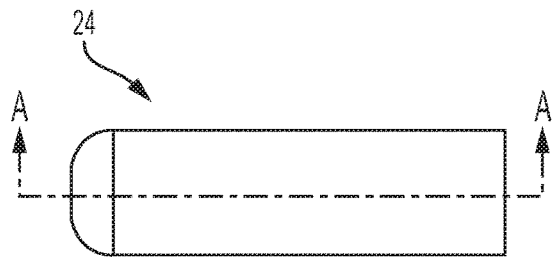
FIG. 12 is a side view of an exemplary pilot cup.
Figure 13:
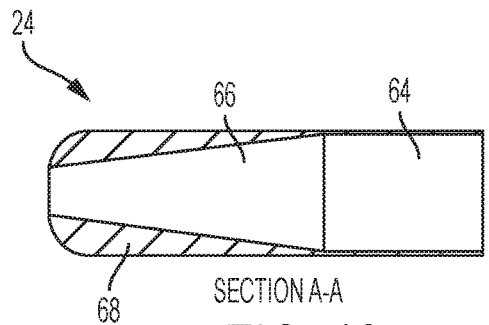
FIG. 13 is a sectional view of FIG. 12.
Figure 14:
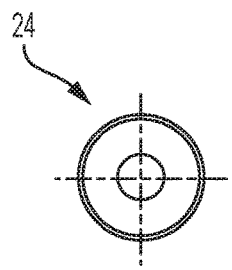
FIG. 14 is a front view of FIG. 12.
Figure 15:
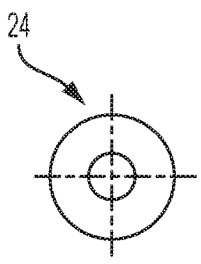
FIG. 15 is a rear view of FIG. 12.

As best shown in FIGS. 5-7, the guide 20 includes a receiving end 44 having a funnel-shaped body surrounding an aperture and a cylindrical shaft 46 extending from the receiving end 44. The receiving end 44 is positioned outside of the casing 12, while the shaft 46 extends into the first chamber. In alternative exemplary embodiments, the receiving end 44 and the shaft 46 are positioned either partly or entirely, in the first chamber. The receiving end 44 may be a variety of shapes and sizes, depending on relevant factors such as the cable shape and size. The interior surface of guide 20 can include one or more curvilinear transitions between the outer edge of the receiving end 44 and the shaft 46. In an exemplary embodiment where there is more than one curved transition, the transitions can have a different radius of curvature. For example a transition proximate the outer edge can have a first radius of curvature while a transition proximate the shaft 46 can have a second radius of curvature that is larger than the first radius of curvature.

The shaft 46 has a first inner surface defining a first section 48 with a first diameter and a second inner surface defining a second section 50 with a second diameter. The diameter of the first section 48 is less than the diameter of the second section 50, forming a ledge 52 at the transition between the two. The first section 48 includes a groove 54. The outer surface of the shaft 46 includes one or more ribs 56. The ribs 56 engage the inner casing surface providing a secure fit between the casing 12 and the guide 20, assisting in retaining the guide 20 in position and preventing unwanted movement relative to the casing 12.

An exemplary embodiment of an escort cup 22 is shown in FIGS. 8-11. The escort cup 22 is positioned behind the guide 20 to receive the conductor 10 as it is inserted into the casing 12. The escort cup 22 can be either connected to, adjacent to, or spaced laterally from the guide 20. After a cable is inserted into and passes through the guide 20, it enters the escort cup 22 to travel through the first jaw assembly 26. At least a portion of the escort cup 22 can be initially positioned in the first jaw assembly 26.

The escort cup 22 includes a front end 58 having an opening for receiving a cable and a rear shaft 60. The front end 58 has a substantially cylindrical outer surface and an inner surface having a tapered section forming a frusto-conical region. The tapered section allows for proper engagement of different sized conductors. A groove 62 is formed around the rear shaft. The rear shaft 60 is hollow with a substantially cylindrical configuration. The escort cup 22 helps to keep the outer strands of the cable 10 from splaying.

An exemplary embodiment of a pilot cup 24 is shown in FIGS. 12-15. The pilot cup 24 is positioned behind the guide 20 and the escort cup 22 to receive the conductor 10 as it is inserted into the casing 12. The pilot cup 24 can be either connected to, adjacent to, or spaced laterally from the escort cup 22. After a cable 10, or a portion thereof, is inserted into and passes through the guide 20 and the escort cup 22, it enters the pilot cup 24 to travel through the first jaw assembly 26. At least a portion of the pilot cup 24 can be initially positioned in the first jaw assembly 26.

According to the exemplary embodiment, the pilot cup 22 has a cylindrical outer surface with an open first end having a first diameter and an open second end having a second diameter less than the first diameter. In alternative embodiments, a variety of shapes, sizes, and configurations may be used. The pilot cup 24 has a first inner surface surrounding a first chamber 64 with a first diameter proximate to the first end and a tapered second inner surface surrounding a second chamber 66 with a varying diameter proximate to the second end. The tapered second chamber 66 allows for proper engagement of different sized conductors. The diameter of the first chamber 64 is greater than the diameter of the second chamber 66, resulting in the pilot cup 24 having a thicker, inner rear wall 68. When the pilot cup 24 is positioned in the first jaw assembly 26, the thicker rear wall 68 provides additional support against the force exerted by the first jaw assembly 26 on the pilot cup 24, helping to prevent the pilot cup 24 from becoming crushed, deformed, or dislodged. The pilot cup 24 helps to keep the inner strands of the cable 10 from splaying.

Figure 16:
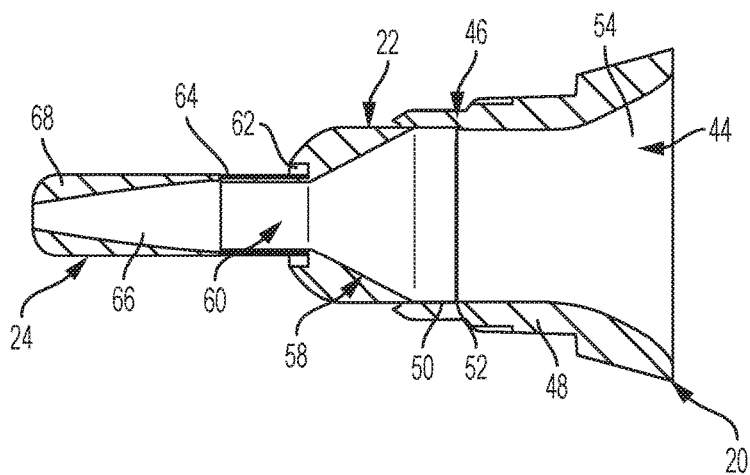
FIG. 16 is a sectional view of the exemplary guide, escort cup, and pilot cup.

As best shown in FIG. 16, in an initial or loading position, the guide 20, the escort cup 22, and the pilot cup 24 are connected to form a guide assembly. The escort cup 22 is initially positioned at least partially inside of the second section of the guide 20, with a front end of the escort cup engaging the ledge 52. The rear shaft 60 of the escort cup 22 is at least partially positioned inside of the pilot cup 24 so that a portion of the pilot cup 24 is received in the outer groove 62. As a cable 10 is inserted, the escort cup 22 and pilot cup 24 disengage from the guide 20, traveling through the first jaw assembly 26. In some embodiments, the position and spacing of the guide 20, escort cup 22, and the pilot cup 24 can be varied.

Figure 17:
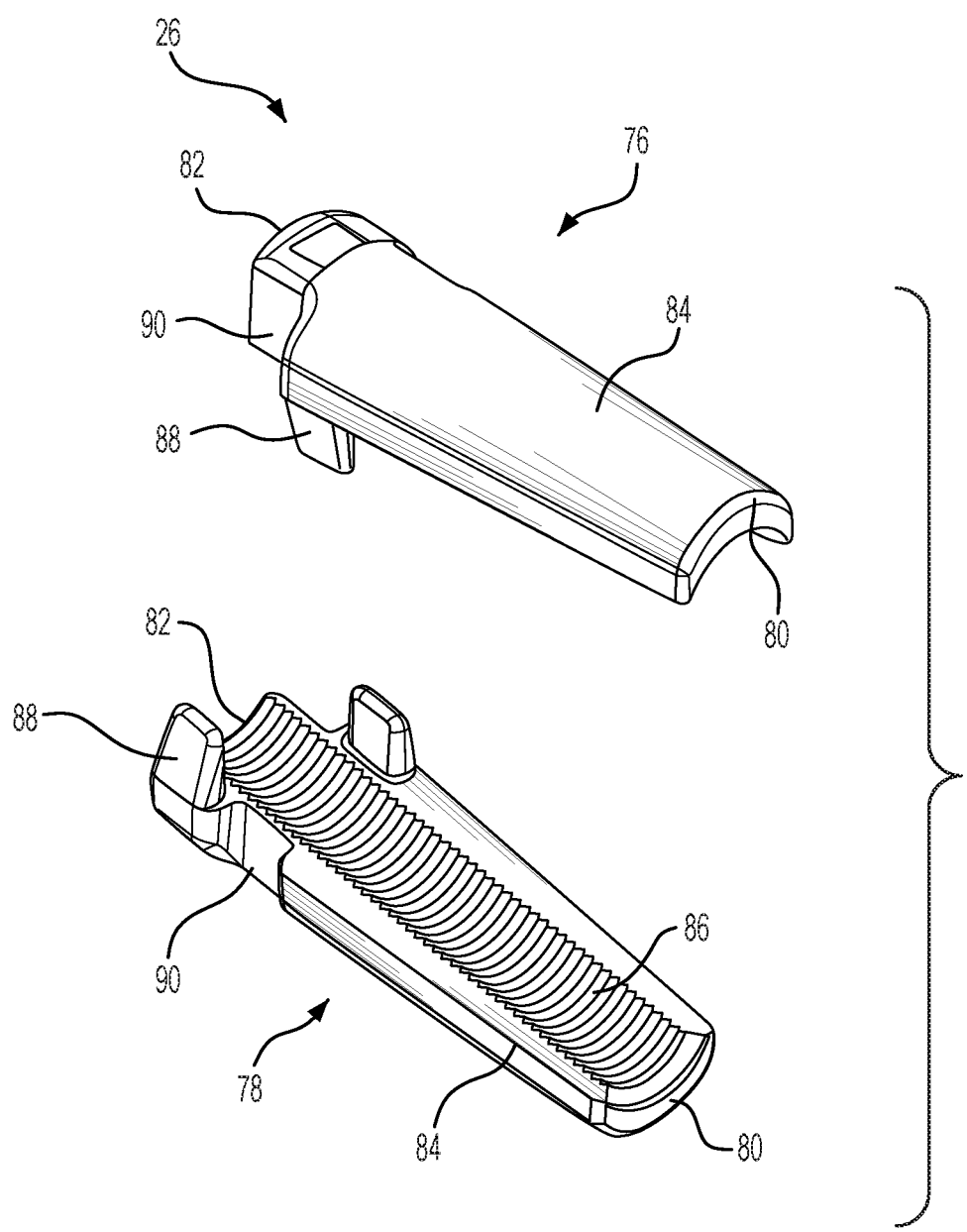
FIG. 17 is an exploded perspective view of an exemplary jaw assembly.
Figure 18:
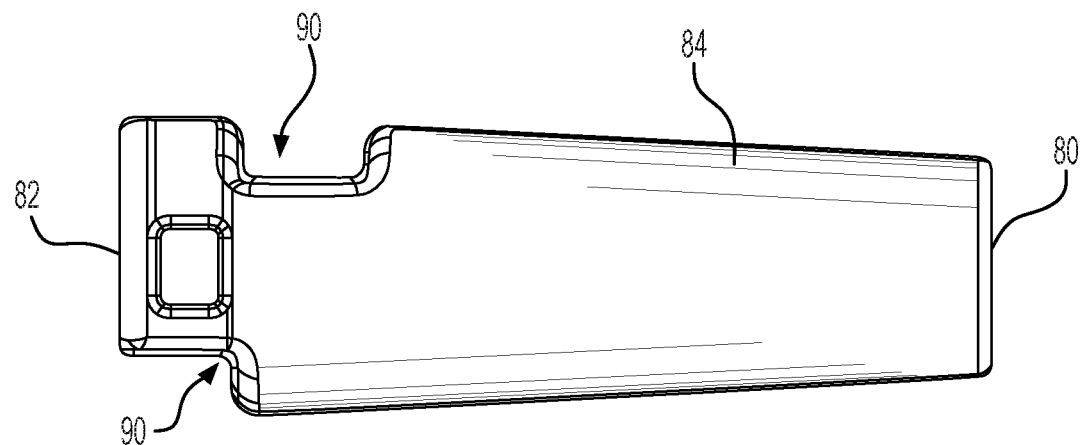
FIG. 18 is a top view of the jaw member of FIG. 17.
Figure 19:
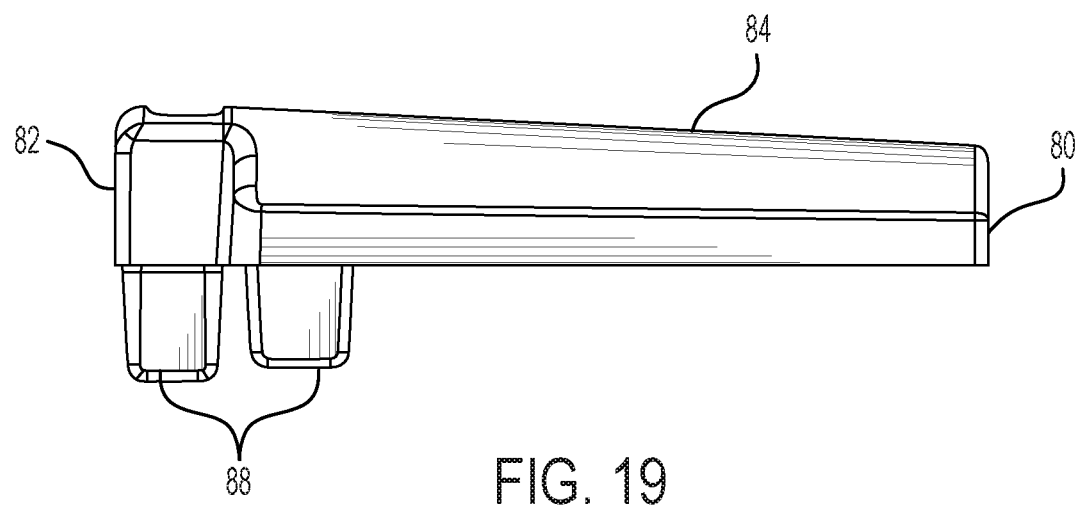
FIG. 19 is a side view of the jaw member of FIG. 17.
Figure 20:
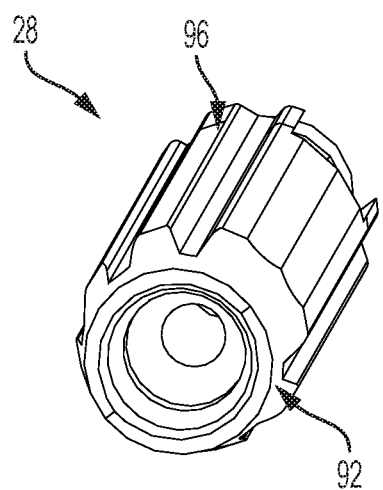
FIG. 20 is front perspective view of an exemplary carrier.
Figure 21:
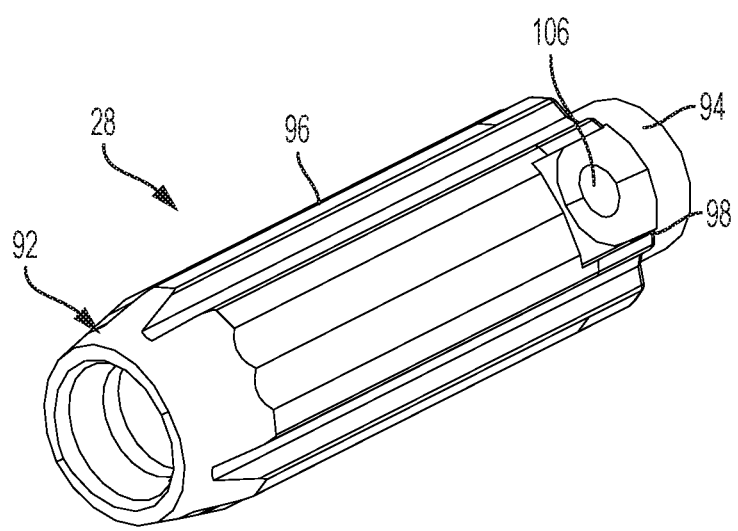
FIG. 21 is side perspective view of FIG. 20.
Figure 22:
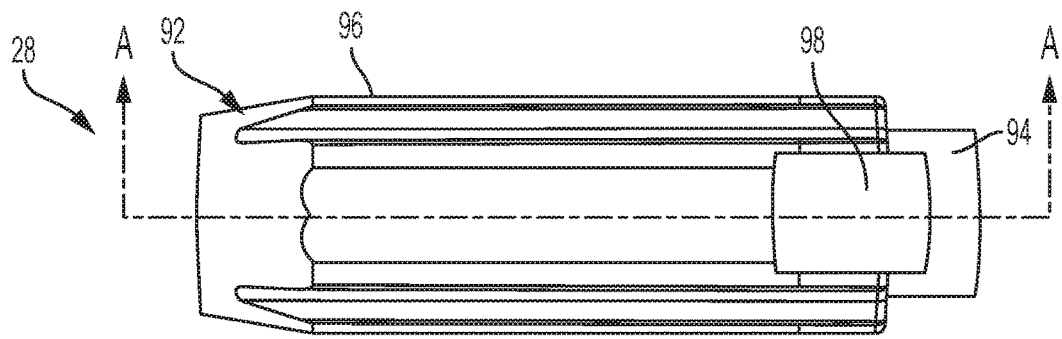
FIG. 22 is a top view of FIG. 20.
Figure 23:
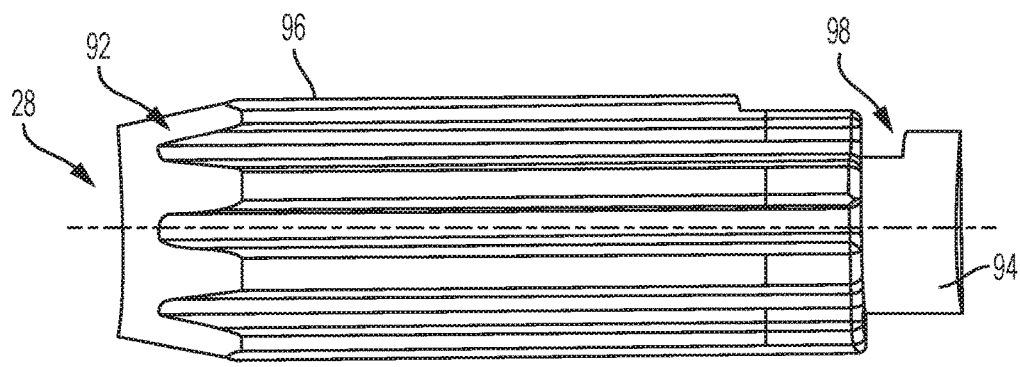
FIG. 23 is a side view of FIG. 20.

The first jaw assembly 26 is positioned between the guide assembly and the first outer biasing member 36. As best shown in FIGS. 17-19, the first jaw assembly 26 includes an upper jaw member 76 and a lower jaw member 78. Though two jaw members 76, 78 are shown in this exemplary embodiment, one jaw member or more than two jaw members may also be used. Certain embodiments may utilize other cable retainers, instead of, or in combination with, the jaw members 76, 78, as would be understood by one of ordinary skill in the art.

The upper jaw member 76 and the lower jaw member 78 are substantially identical as shown in FIG. 17, and the same references numbers will be used for like parts in describing the jaw members 76, 78. The jaw members 76, 78 have a front jaw surface 80, a rear jaw surface 82, and a jaw body 84 extending therebetween. The jaw body 84 has an arcuate outer surface and an inner surface. At least a portion of the jaw body 84 has a semi-funnel-shape, tapering towards the front jaw surface 80. This taper is similar to or corresponds to the taper of the inner casing surface, allowing the jaw members 76, 78 to slide within the first chamber. At least a portion of the jaw body 84 inner surface contains a series of teeth 86. The teeth 86 may have any shape, pitch, length, width, or spacing. In the exemplary embodiment, the teeth 86 extend from the inner surface at an angle towards the rear jaw surface 82.

The jaw members 76, 78 include one or more radially extending projections 88 and one or more corresponding openings 90. The projections 88 and openings 90 may have a variety of sizes or shapes. The projections 88 and openings 90 are staggered, so that a single part may be used for the upper jaw member 76 and the lower jaw member 78. When placed together, the projections 88 from the upper jaw member 76 will mate with the openings 90 of the lower jaw member 78 and vice versa. This mating relationship couples the upper jaw member 76 to the lower jaw member 78 to prevent one jaw member from moving axially relative to the other jaw, ensuring substantially uniform axial movement between the jaw members 76, 78. The projections 88 extend radially inwardly and have a length preventing disengagement as the jaw members 76, 78 are moved radially away from one another by being pushed towards the central region 18, but also prevents the projections 88 from interfering with movement of the jaw members 76, 78 as they are biased towards the first casing end 16 by extending through the openings 90 and contacting the inner casing surface 42.

According to an exemplary embodiment, the biasing member 36 has a first end for contacting the rear jaw surface 82 and a second end for contacting the carrier 28. In the exemplary embodiment shown, the biasing member 36 is a coil spring, although the biasing member 20 can be other devices or materials. The outer diameter, wire diameter, pitch, length and material type of the spring may be varied depending on the application.

FIGS. 20-24 show an exemplary embodiment of the carrier 28. The carrier 28 has a body surrounding an interior with a front section facing the first aperture 40 and a second end facing the center stop 34. The body has a substantially tubular configuration with a nose 92, a back wall 94, and one or more ridges 96. A window 98 is formed near the back wall 94.

In an exemplary embodiment, the interior includes a first region 100, a second region 102, and a third region 103. The first region 100 includes an opening 100 for receiving the escort cup 22. Although a bell-shaped opening is shown, the configuration of the open can vary, for example to accommodate escort cups 22 having different sizes and shapes. The second region 102 has a frusto-conical shape that widens from the first region 100 to the third region 103. The third region 103 has a substantially cylindrical configuration and is in communication with the window 98. An aperture 106 is provided in the back wall 94.

Figure 29:
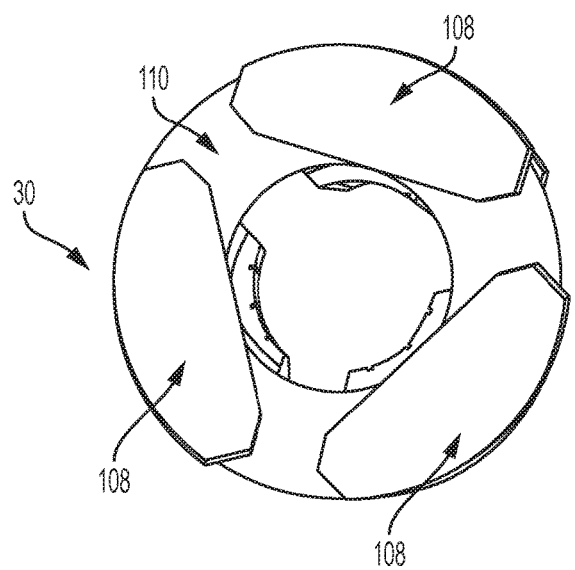
FIG. 29 is a front view of FIG. 28.
Figure 30:
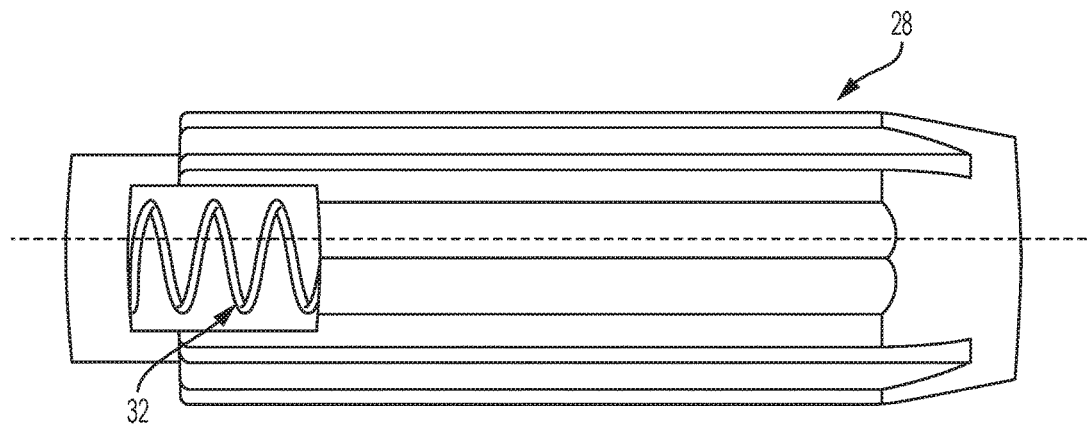
FIG. 30 is a top view of the exemplary carrier and second jaw assembly.
Figure 31:
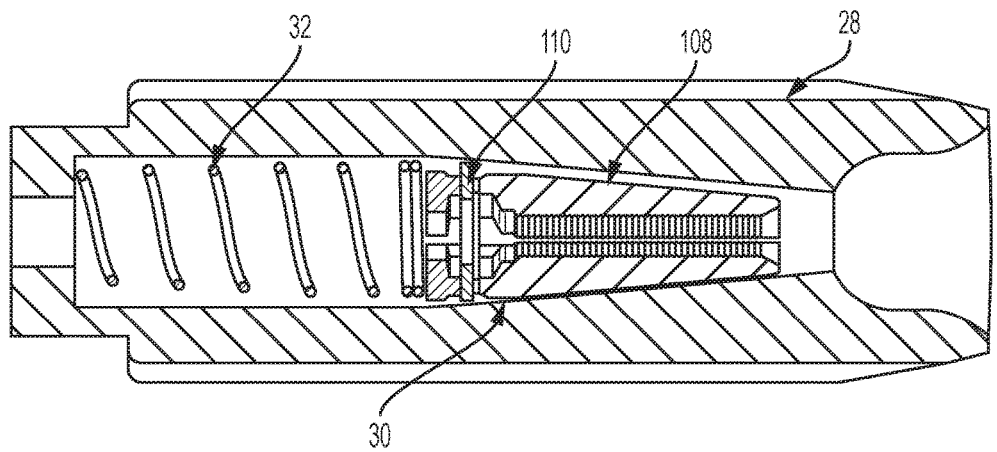
FIG. 31 is a sectional view of FIG. 30.
Figure 35:
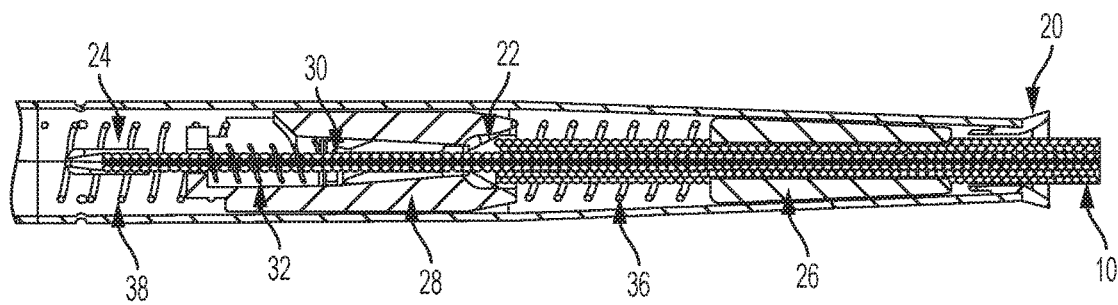
FIG. 35 is a sectional view of the exemplary splice after the cable has been fully inserted.

The second jaw assembly 30 is positioned in the interior of the carrier 28. In an exemplary embodiment, the second jaw assembly 30 includes three jaw members 108 and a retainer 110. The jaw members 108 have a front jaw surface 112, a rear jaw surface 114, and a jaw body 116 extending therebetween. The jaw body 116 has an arcuate outer surface and an inner surface. At least a portion of the jaw body 116 angles or tapers towards the front jaw surface 112, allowing the jaw member 108 to move or slide within the carrier 28. At least a portion of the jaw body 116 inner surface contains a series of teeth 118. The teeth 118 may have any shape, pitch, length, width, or spacing. First and second slots 120 are formed in the jaw body 116 to receive the retainer 110. The retainer 110 has three slots 122 configured to mate with the slots 120 in the jaw member 108 and three curved sections 124 having an outer edge that substantially aligns with the outer edge of the jaw body 116 to give the assembly a substantially circular configuration as shown in FIG. 29. As shown in FIGS. 30 and 31, the second jaw assembly 30 and the inner biasing member 32 are positioned in the interior of the carrier 28. The second jaw assembly 30 and the biasing member 32 can be loaded into the carrier 28 through the carrier window 98.

FIGS. 32 and 33 show an exemplary embodiment of a center stop 34. The center stop 34 has a center wall 126, a first opening 128, and a second opening 130. The first opening 128 receives a second end of the second outer biasing member 38 and at least partially encloses a portion of the biasing member 38. The partial enclosure helps maintain the biasing member 38 in place, preventing it from becoming dislodged and failing to exert proper biasing force in the correct direction. According to various exemplary embodiments, the center stop 34 is substantially cylindrical having corresponding cylindrical first and second openings 128, 130, although any shape, or combination of shapes, of center stop 34 and first and second openings 128, 130 may be used. The center stop 34 is held in position in the central chamber by a first and second set of dimples 132A, 132B.

Figure 37:
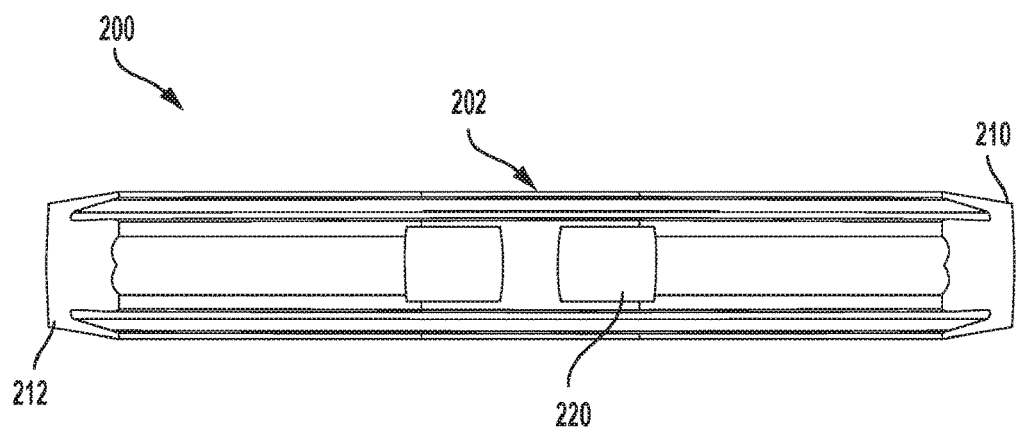
FIG. 37 is a top view of a dual chamber carrier.
Figure 38:
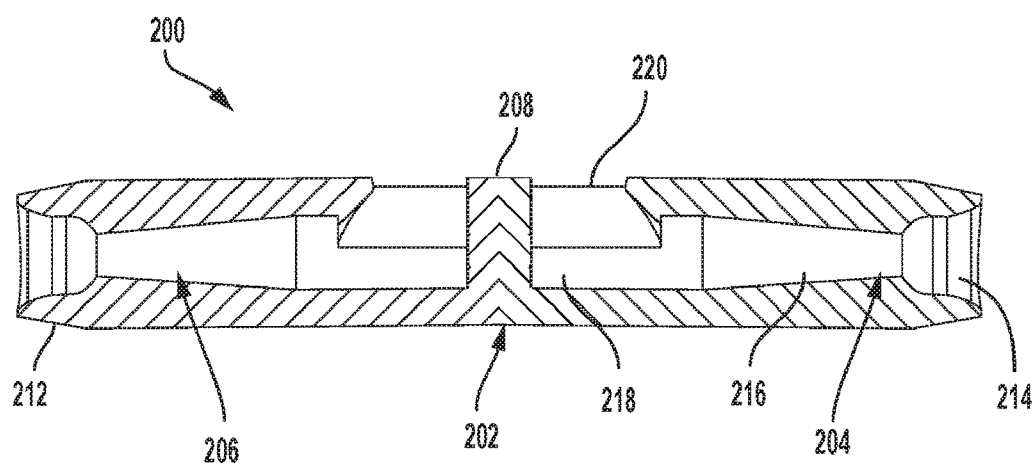
FIG. 38 is a sectional view of FIG. 37.

In an alternative embodiment, an example of which is illustrated in FIGS. 37 and 38, the carrier can be a dual chamber carrier 200 that includes a first side having the configuration shown in FIGS. 30 and 31 and a second side having a substantially identical opposite facing configuration. In this embodiment, the center stop 34 and the biasing members 38 can be removed. The first and second sides of the dual chamber can be separated by a single back wall 94 or other structure. In an exemplary embodiment, the structure separating the first and second sides can be configured to interface with the first and second set of dimples 132A, 132B to hold the carrier in place.

Figure 24:
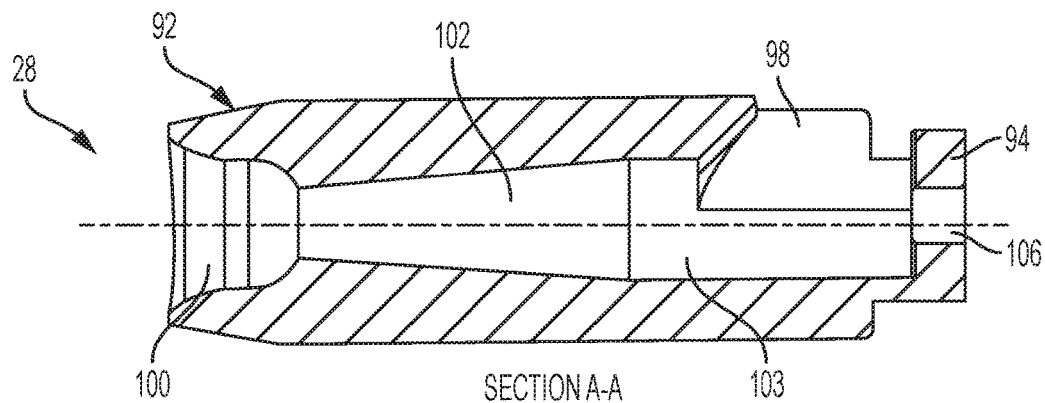
FIG. 24 is a sectional view of FIG. 23.
Figure 25:
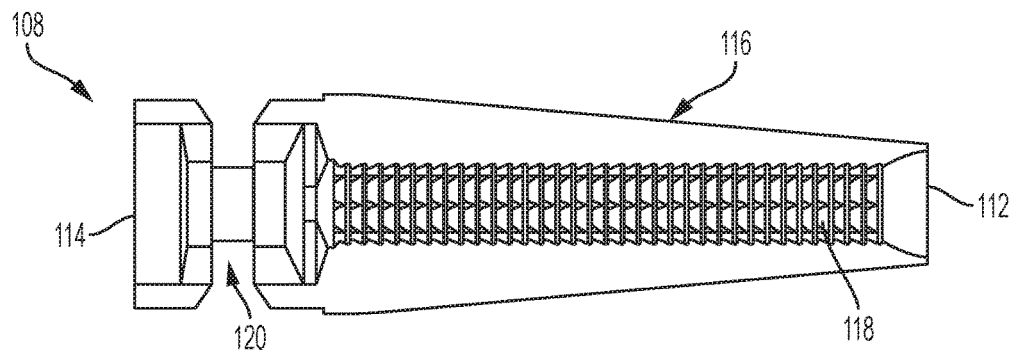
FIG. 25 is a bottom view of an exemplary jaw member of the second jaw assembly.
Figure 26:
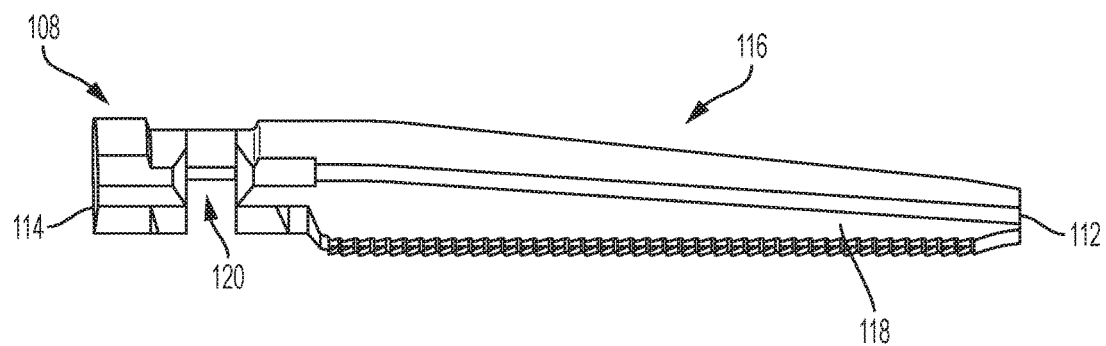
FIG. 26 is a side view of FIG. 25.
Figure 27:
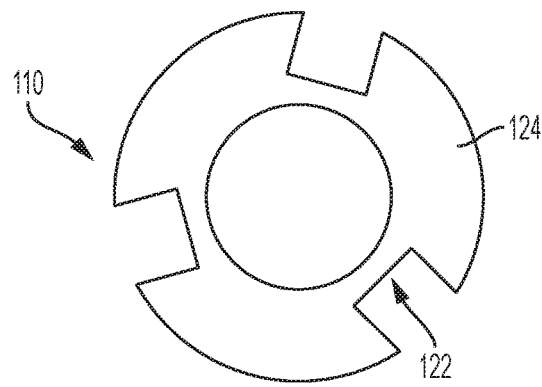
FIG. 27 is front view of an exemplary retainer of the second jaw assembly.
Figure 28:
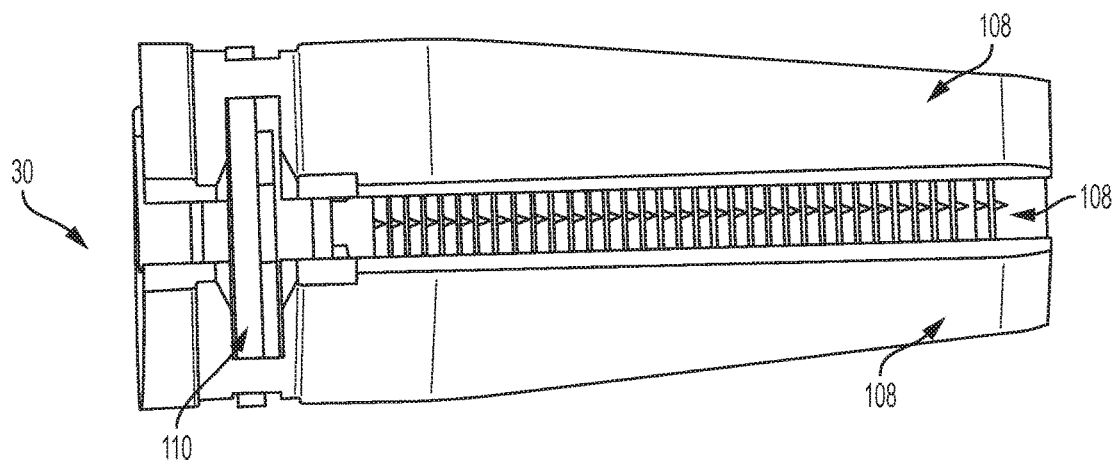
FIG. 28 is a side view of the exemplary second jaw assembly.

For example, the dual chamber carrier 200 has a body 202 surrounding a first interior 204 and a second interior 206. The first interior 204 and the second interior 206 are separated by a center wall 208. The center wall 208 can be closed as shown in FIG. 38 or include a through opening as shown in FIG. 24. The body 202 has a substantially tubular configuration with a first nose 210 facing the first aperture 40 and a second nose 212 facing the second aperture 42.

The first interior 204 includes a first region 214, a second region 216, and a third region 218. The first region 214 includes an opening for receiving the escort cup 22. Although a bell-shaped opening is shown, the configuration of the open can vary, for example to accommodate escort cups 22 having different sizes and shapes. The second region 216 has a frusto-conical shape that widens from the first region 214 to the third region 218. The third region 218 has a substantially cylindrical configuration and is in communication with a window 220. The second interior 206 has an opposite configuration. A second jaw assembly 30 is positioned in the first interior 204 and the second interior 206 as with the single chamber carrier 28 described above.

FIG. 34 shows an exemplary embodiment of the splice in the initial, or loading, position. The guide 20 extends into the casing 12, the escort cup 22 is positioned in the guide 22, and the pilot cup 24 is connected to the escort cup 22. A portion of the pilot cup 24 and the escort cup 22 are positioned in the first jaw assembly 26, for example between the upper and lower jaw members 76, 78. The position of the escort cup 22 and the pilot cup 24 prevents the upper jaw member 76 and the lower jaw member 78 from moving closer together and prevents them from moving towards the first aperture 40, holding the jaw assembly 26 open to receive a cable 10. In this position the jaw assembly 26 compresses the biasing member 36 in a loading position.

With the automatic splice in the initial, or loading, position, a first cable 10 and a second cable 10 may be loaded into respective ends of the casing 12. In an exemplary embodiment, a portion of the outer layer of the cable is stripped to expose the inner layer. The guide 20 receiving end 44 acts to contain the strands of the cable 10 and guide them into and through the respective first casing aperture 40.

During insertion the inner layer of cables 10 pass through the escort cup 22 and into the pilot cup 24. The inner a layer of the cable 10 engages the pilot cup 24 and the outer layer of the cable 10 engages the escort cup 22. Both the escort cup 22 and pilot cup 24 have tapered interior portions to engage different sized cables 10.

After the cable 10 fully engages the pilot cup 24, the exertion of axial pressure by a user pushes the pilot cup 24, the escort cup 22, and the cable 10 through the first jaw assembly 26. After the escort cup 22 and the pilot cup 24 clear the first jaw assembly 26, the biasing member 36 will push the jaw assembly 26 toward the first aperture 40 to engage the outer layer of the cable 10. As the first jaw assembly 26 moves forward, the tapered jaw body 84 slides along the tapered inner casing surface, forcing the upper jaw 76 and the lower jaw 78 radially closer to one another. The cable 10 may still be able to move toward the center of the splice, with the first jaw members 26 having angled teeth 86 allowing the cable 10 to slide along the teeth 86 toward the center of the splice but resisting movement in the opposite direction.

Because the pilot cup 24 is already positioned in the first jaw assembly 26, the user need not exert substantial force to open the jaw assembly 26 or load the biasing member 36. The rounded outer edge also helps to move the escort cup 22 through the first jaw assembly 26. Moreover, the clamping of the escort cup 22 and pilot cup 24 in the first jaw assembly 26 helps prevent dislodgement and also prevent any splayed ends of the cable 10 from interfering with the jaw assembly 26 or the biasing member 36 that would adversely affect the connection made by the splice.

Further insertion causes the cable 10 and the pilot cup 24 to enter the carrier 28. The escort cup 22 is received in the opening in the first region 100 of the carrier 28. The pilot cup 22 and the cable 10 pass through the second jaw assembly 30 causing the second jaw assembly to engage the inner layer of the cable. The cable 10 can either terminate in the carrier 28 or the pilot cup 24 and cable 10 can pass through the back wall 94 and the aperture 106 depending on the cable length. The pilot cup 24 can initial move the second jaw assembly 30 in the carrier, expanding the second jaw assembly 30 until a certain point is reached where the pilot cup 24 will pass through the jaw members 108 and the retainer 110.

In an alternative embodiment, the guide 20, escort cup 22, and the pilot cup 24 can be removed from the casing 12 prior to inserting the cable 10. Because certain cables have a tendency to splay a significant amount, the cables can be inserted at least partially into the guide 20 and then the outer layer can be removed to expose the inner layer. After the cable is properly retained, i.e. after sliding the escort cup 22 over the outer strands and the pilot cup 24 over the inner strands, the guide 20, escort cup 22, and pilot cup 24 can be inserted back into the casing 12 along with the cable 10.

Figure 36:
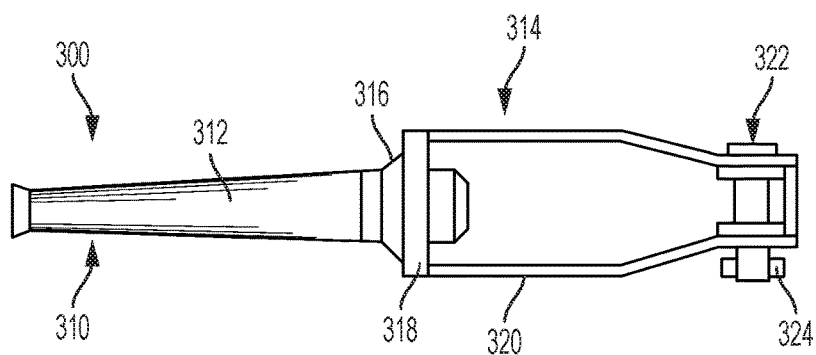
FIG. 36 is a side view of an exemplary embodiment of a dead-end splice.

As best shown in FIG. 36, the configuration of the splice may also be used in a dead-end connector 300. The dead-end connector 300 includes half of an automatic splice 310 having a casing 312. Although not shown, the dead-end splice 310 can include any combination of the internal components of the splice discussed herein. The closed end of the dead-end connector 30 can be considered the central portion. The casing 312 is attached to a dead end connector 314. In this exemplary embodiment a clevis-type dead end connector is used, although other types of connectors may be used as would be understood by one of ordinary skill in the art. The dead end connector 314 includes a retaining washer 316, a yoke 318, and a bail 320. A clevis pin 322 is secured to the bail 320 and retained by a cotter pin 324.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present invention, and are not intended to limit the structure of the exemplary embodiments of the present invention to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A cable splice comprising:
   a casing having a central portion and a first end including a first aperture, wherein the casing defines an interior cavity;
   a guide assembly extending through the first opening into the interior cavity;
   a first clamp member positioned in the interior cavity and moveable between a loading position and a terminated position;
   a first biasing member biasing the first clamp member toward the terminated position;
   a carrier positioned in the interior cavity between the first biasing member and the central region, wherein the carrier includes a body having an outer surface positioned inside of the interior cavity; and
   a second clamp member positioned in the carrier and moveable with respect to the carrier.

2. The cable splice of claim 1, wherein the guide assembly includes a guide, an escort cup moveable in the interior cavity with respect to the guide, and a pilot cup moveable within the interior cavity with respect to the guide and the escort cup.

3. The cable splice of claim 2, wherein the escort cup includes a rear shaft that is configured to extend into the pilot cup in a loading position.

4. The cable splice of claim 1, wherein the second clamp member includes a first jaw member, a second jaw member, and a third jaw member.

5. The cable splice of claim 4, further comprising a retainer having a first slot, a second slot, and a third slot, and wherein the first slot receiving the first jaw member, the second slot receives the second jaw member and the third slot receives the third jaw member.

6. The cable splice of claim 1, wherein the carrier includes a window for inserting the second clamp into the carrier.

7. The cable splice of claim 1, wherein the carrier includes a front opening configured to receive at least a portion of the escort cup.

8. The cable splice of claim 1, further comprising a second biasing member positioned in the carrier biasing the second clamp member.

9. The cable splice of claim 8, further comprising a stop positioned in the interior cavity and a third biasing member positioned between the stop and the carrier.

10. The cable splice of claim 1, wherein the carrier includes first chamber containing the second clamp member and a second chamber including a third clamp member facing the opposite direction of the second clamp member, and wherein the carrier includes structure positioned between the first and second chambers configured to interface with a dimples formed in the casing.

11. A cable splice comprising:
    a casing having an opening configured to receive a cable, wherein the casing defines an interior cavity;
    a guide extending into the casing;
    a escort cup positioned in the casing and configured to receive an outer layer of the cable, the escort cup moveable with respect to the guide;
    a pilot cup positioned in the casing and configured to receive an inner layer of the cable, the pilot cup moveable with respect to the guide and the escort cup;
    a first jaw assembly positioned in the interior cavity and moveable between a first loading position configured to receive the cable and a first terminated position configured to engage the outer layer of the cable; and
    a second jaw assembly positioned in the interior cavity and moveable between a second loading position configured to receive the cable and a second terminated position configured to engage the inner layer of the cable.

12. The cable splice of claim 11, wherein prior to insertion of the cable, the escort cup is connected to the guide and the pilot cup is connected to the escort cup.

13. The cable splice of claim 11, wherein the guide includes a receiving end positioned outside of the casing and a shaft extending inside of the casing.

14. The cable splice of claim 13, wherein prior to insertion of the cable a first portion of the escort cup extends into the guide and a second portion of the escort cup extends into the pilot cup.

15. The cable splice of claim 14, wherein the escort cup includes a groove for receiving the pilot cup.

16. The cable splice of claim 11, further comprising a carrier positioned in the interior cavity, wherein the second jaw assembly is positioned in the carrier.

17. The cable splice of claim 16, wherein the carrier includes a first region configured to receive the escort cup, a second region having a tapered portion for moveably receiving the second jaw assembly, and a third region in communication with a window.

18. The cable splice of claim 11, wherein a first biasing member biases the first jaw assembly toward the first terminated position and a second biasing member biases the second jaw assembly toward the second terminated position.

19. The cable splice of claim 11, wherein the pilot cup is configured to move with the cable inner layer through the first jaw assembly and the second jaw assembly.

20. The cable splice of claim 11, wherein the first jaw assembly is axially and radially moveable in the casing and the second jaw assembly is axially and radially moveable in the casing.

21. A method of connecting utility line conductors comprising:
    stripping a multi-strand cable to remove a portion of an outer layer and expose an inner layer;
    inserting the cable into a cable splice that includes an escort cup, a pilot cup, a first jaw assembly, a carrier, and a second jaw assembly positioned in the carrier;
    engaging the inner layer of the cable with the pilot cup;
    engaging the outer layer of the cable with the escort cup;
    moving the pilot cup through the first jaw assembly;

moving the escort cup through the first jaw assembly; and
moving the pilot cup into the carrier and through the second jaw assembly.

\* \* \* \* \*